Figures 1, 2:
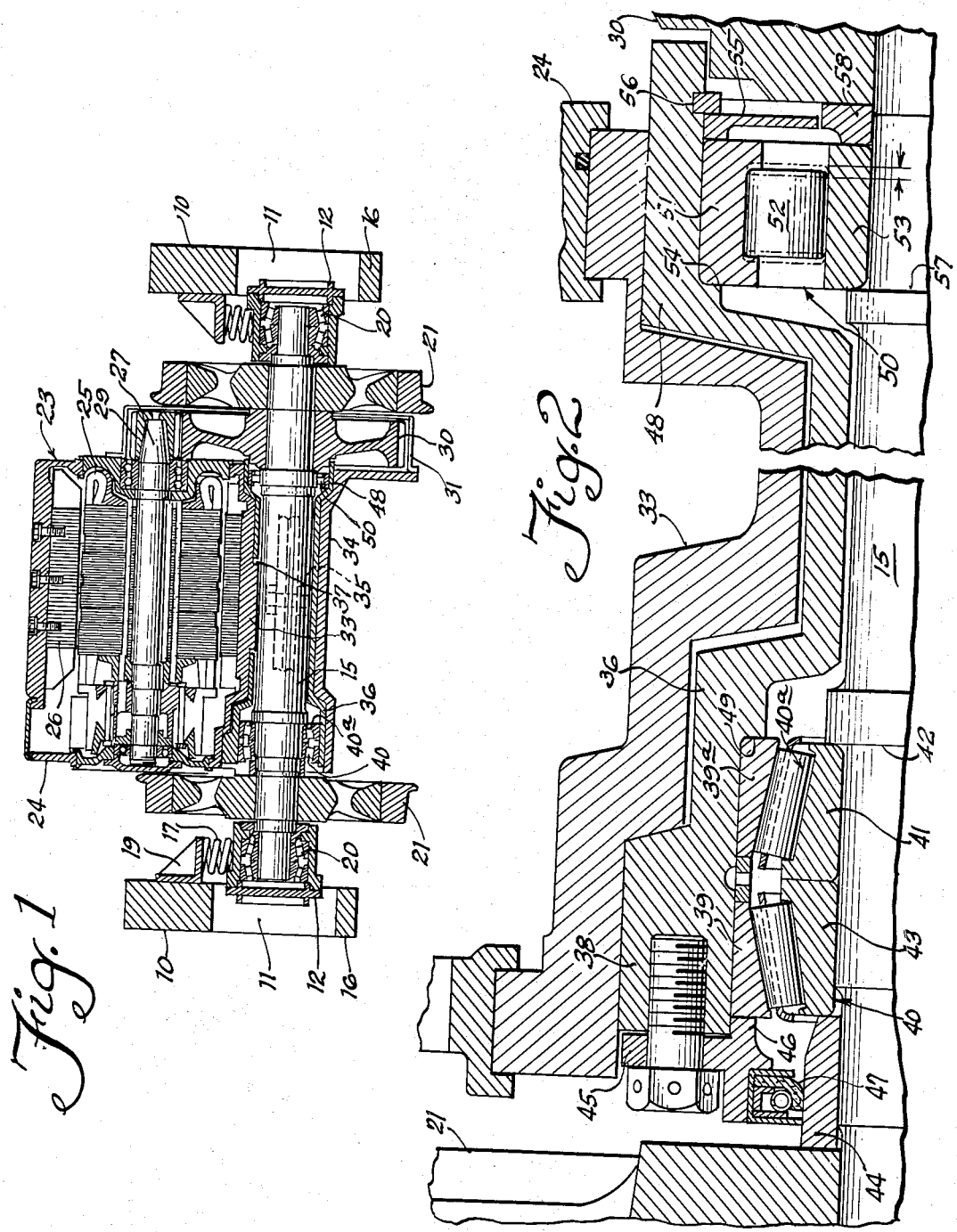

April 24, 1956 — R. B. ENYART — 2,742,864
MOTOR BEARING SUPPORT ON AXLE
Filed Dec. 11, 1952

INVENTOR.
Roy B. Enyart
BY Murray A. Gleeson
Attorney

United States Patent Office 2,742,864
Patented Apr. 24, 1956

2,742,864

MOTOR BEARING SUPPORT ON AXLE

Roy B. Enyart, Chicago, Ill., assignor to Goodman Manufacturing Company, Chicago, Ill., a corporation of Illinois Application December 11, 1952, Serial No. 325,377

3 Claims. (Cl. 105—136)

This invention relates to improvements in bearing supports for motors and more particularly relates to a novel and improved form of bearing support for a locomotive drive motor on its driven axle.

Electric haulage locomotives and particularly those operable in mines underground are usually propelled by electric motors journaled on the locomotive axle and driving the axle through spur reduction gearing, and are yieldably restrained from movement about the axle.

Such locomotives are frequently stored outside of the mine during the night in an unheated shed, and are usually cold when going into the mine in the morning. Where a locomotive travels down a long grade into the mine and is held back by its brakes, the brake shoes will frequently become red hot with a temperature rise in the neighborhood of 550° C. This may raise the temperature of the axle approximately 110° C. over a long down grade. The motor and shell, however, will remain relatively cold. This difference in temperature between the motor shell and axle may result in the expansion of the axle with respect to the motor shell a length of approximately .0358 inch for an axle 30 inches long. This difference in expansion between the axle and motor mounting is frequently so great as to strip the threads of the retainers for the usual end thrust bearings at opposite ends of the axle, and journaling the axle within the motor mounting.

In a contrary manner, where the locomotive is pulling a heavy trip up a long grade, the motor and its mounting will become relatively hot while the axle will be much cooler than the motor mounting a difference in temperature for an average condition being 75° C., resulting in an expansion of the bearing sleeve or support for the bearings of approximately 0.0258 inch with respect to the axle with the resultant excessive thrust loads on the end thrust bearings supporting the motor on the axle.

My invention has as its principal object to remedy these difficulties by providing a mounting for a drive motor on its driven shaft accommodating independent expansion and contraction of the motor shell and axle.

Another object of my invention is to provide a simple and improved form of bearing mounting for a locomotive motor on a drive axle for the locomotive providing for independent expansible and retractable movement of the locomotive axle and axle housing on the motor shell with respect to each other.

Still another object of my invention is to provide an improved form of motor support for a drive motor on a locomotive axle in which the bearing support for the motor shell includes a bearing sleeve carrying end thrust bearings at one end taking endwise axle thrust in opposite directions and a radial bearing at the other end accommodating extensible movement of the axle with respect to the bearing sleeve and vice versa.

Still another object of my invention is to provide a motor bearing support particularly adapted for mine locomotives in which the motor shell is supported on the locomotive axle on a bearing sleeve on oppositely disposed axial thrust bearings at one end and on a cylindrical roller bearing at the other end, accommodating endwise extensible movement of the sleeve and axle with respect to each other.

These and other objects of my invention will appear from time to time as the following specification proceeds and with reference to the accompanying drawings wherein:

Figure 1 is a transverse sectional view taken through a locomotive motor and axle, and illustrating one form in which my invention may be embodied; and Figure 2 is an enlarged fragmentary sectional view taken through the locomotive axle and bearing support for the motor shell on the axle, and showing certain details of my invention not shown in Figure 1.

In the embodiment of my invention illustrated in Figure 1 of the drawings, I have shown a cross-section through a locomotive frame and motor, having side plates 10, 10 having vertical guides 11, 11 extending therealong and forming guides for axle boxes 12, 12. The axle boxes 12, 12 form bearing mountings for opposite ends of a locomotive axle 15. The guides 11, 11 may be closed by retainer bars 16, 16 secured to the bottoms of the side plates 10, 10 and extending across the guides, 11, 11. The locomotive frame may be spring mounted on the axle boxes 12, 12 by compression springs 17, 17 seated on the tops of said axle boxes and on the bottoms of spring retainers 19, 19 extending inwardly from the side plates 10, 10.

Inwardly of the thrust bearings 20, 20 and keyed or otherwise secured to the axle 15 are flanged wheels 21, 21 for the locomotive, for propelling the locomotive along rails (not shown) in a well known manner. A motor 23 is shown as driving the axle 15 and as being pivotally mounted thereon for yieldable movement about said axle, to take up torsional loads when starting and stopping the locomotive. The motor 23 is shown as being a well known form of electric motor having a motor shell 24 enclosing the usual armature 25 and fields 26. The armature 25 is shown as having an armature shaft 27 journalled in opposite ends of the motor shell 24 and having a motor pinion 29 thereon, meshing with and driving a spur gear 30, enclosed within a gear casing 31 secured to the pinion end of said motor shell.

The motor shell 24 is also shown as having an axle housing 33 within which the axle 15 is journaled. A suitable axle cap 34 secured to said housing as by bolts 35, 35 is provided to close said housing and mount the axle 15 therein.

The axle housing 33 and axle cap 34 are shown as having a bearing support sleeve 36 mounted therein and forming a mounting for the bearing journaling the locomotive axle 15 within said axle housing. The bearing sleeve 36 is shown as being radially spaced from the axle 15 and as being held from rotation by an inwardly extending projection 37 of the axle housing 33 extending within and having interengagement with said sleeve.

The bearing sleeve 36 is shown as having an enlarged diameter outer end portion 38, shown in Figure 2 as being the left hand end of said sleeve, within which is mounted outer races 39 and 39a of oppositely facing end thrust bearings 40 and 40a. The end thrust bearings 40 and 40a are herein shown as being roller types of bearings, although not necessarily such bearings and shown as being arranged to take end thrust on the axle 15 in opposite directions.

An inner race 41 of the inner end thrust bearing 40a is shown as being seated against a shoulder 42 of the axle 15. The shoulder 42 transmits axial thrust from the axle to the inner race 41 and to the outer bearing race 39, arranged to resist endwise thrusting movement of the axle to the left through an inner race 43 of the outer thrust bearing 40 and the associated bearing rollers interposed between the races 43 and 39. The inner race 43 of the outer thrust bearing 40 faces oppositely from the inner race 41 of the inner bearing and is abutted at its outer end by a thrust collar 44, interposed between the wheel 21 and the outer end of said inner race 41. The thrust collar 44 and race 43 transmit thrust to the right to the inner race 41 and the outer race 39a through the rollers of the bearing 40a.

An annular retainer 45 is shown as being secured to the end 38 of the bearing sleeve 36 as by cap screws, and as encircling the collar 44 and axle 15. The retainer 45 has an inward annular projection 46 abutting the outer end of the outer race 39. A bearing seal 47 is shown as being carried by said retainer and engaging the collar 44.

The outer race 39a for the inner bearing 40a is shown as abuting an inner shouldered portion 49 of the bearing sleeve 36, to take end thrust reactions toward the right.

The opposite end of bearing sleeve 36 is shown as having an enlarged diameter outer end portion 48 within which is seated a radial thrust roller bearing 50, herein shown as being a well known form of cylindrical roller bearing, although not necessarily such a bearing. The bearing 50 is shown as having a flanged outer race 51, flanged at each side thereof, to engage opposite sides of cylindrical rollers 52, 52. Said bearing also has a straight inner race 53. The outer race 51 is shown as abutting an inner shoulder 54 of the bearing sleeve 36, at one end thereof. Said outer race is abutted at its opposite end by a retainer ring 55 held within the bearing sleeve 36 as by a snap ring 56.

The inner race 53 is shown as abutting at its inner end a shoulder 57 on the axle 15, and as being abutted at its opposite end by a collar 58 interposed between the hub of the spur gear 30 and said inner race. The flanged end portion 48 of the bearing sleeve 36 is shown as extending over the hub of the spur gear 30 in close proximity with respect thereto. The inner edge of the retainer ring 55 is shown as being relatively close to the outer periphery of the collar 58 to prevent dust and dirt from getting into the bearing 50.

During operation of the locomotive, when the motor shell 24 and bearing sleeve 36 have a greater temperature rise than the axle 15, caused by heating of the motor, or when the temperature rise of the axle 15 is greater than that of the bearing sleeve 36 and motor shell 24, the end thrust bearings 40 and 40a seated on said axle and clamped to said sleeve will retain the axle 15 to the sleeve 36 and hold said axle from movement with respect to said sleeve. The cylindrical bearing 50 having the straight inner race 53, however, will accommodate the rollers to move along the inner race in accordance with elongation of the axle 15 or in a contrary manner in accordance with elongation of the bearing sleve 36. The axle 15 or bearing sleeve and axle housing 33 may thus expand or contract with respect to each other without placing undue stresses on said bearing sleeve or the axial thrust bearings 40 and 40a. Thus during elongation or contraction of either the axle or axle housing, the roller 52 of the bearing 50 may slide laterally along the straight periphery of the inner race 53 of the bearing as indicated by dotted lines in Figure 2 and accommodate said axle or axle housing to expand or contract without placing undue loads on the axle or thrust bearings therefor, or on the retainers for said bearings.

It will be understood that modifications and variations may be effected without departing from the scope of the novel concepts of the present invention.

I claim as my invention:

1. A locomotive bearing support for a locomotive motor on the drive axle therefor, comprising a motor shell having an axle housing, an axle rotatably carried within said axle housing, and bearing support means for said motor on said axle comprising a bearing sleeve, mounted in said axle housing and having said axle extending therethrough and spaced radially therefrom, oppositely arranged end thrust bearings journalling said axle within one end of said sleeve, and a radial bearing having one straight race journalling said axle in the other end of said sleeve, said radial bearing accommodating relative endwise movement between said sleeve and axle to compensate for expansible and retractable movement thereof.

2. In a motor bearing support of the class described, a motor shell having an axle housing, an axle having traction wheels thereon, journalled within said axle housing and forming a support for said motor shell, a gear on said axle driven by said motor, and a bearing support for said motor on said axle accommodating limited yieldable movement of said motor about said axle and expansible and retractable movement of said axle and motor housing with respect to each other, comprising a bearing sleeve spaced along said axle and mounted within said axle housing and spaced radially of said axle, and end thrust bearing means mounting one end of said sleeve on said axle and taking end thrust on said axle in opposite directions and a radial bearing mounted within the other end of said sleeve and journalling said axle thereon, said radial bearing comprising a plurality of cylindrical rollers and one flanged race having retaining engagement with opposite ends of said rollers, and an opposite straight race accommodating movement of said rollers therealong in the direction of the axis of said axle.

3. In a motor bearing support of the class described, a shell for the motor having an axle housing, an axle journaled within said housing and forming a support for said shell, traction wheels on said axle, a gear on said axle driven by said motor, and a bearing support for said motor on said axle comprising a bearing sleeve mounted within said axle housing and spaced radially from said axle, and bearing means mounting said sleeve on said axle comprising two oppositely arranged end thrust roller bearings retained to said axle and sleeve and held from endwise movement with respect thereto and journaling said axle within one end of said sleeve and taking end thrusts on said axle in opposite directions, and a radial roller bearing journaling said axle within the other end of said sleeve and having an inwardly flanged outer race seated in said sleeve and held from endwise movement with respect thereto and having a plurality of cylindrical rollers carried thereby within the flanges thereof and also having a straight inner race retained from endwise movement with respect to said axle and accommodating movement of said cylindrical rollers along said straight inner race in the direction of the axis of said axle.

References Cited in the file of this patent

UNITED STATES PATENTS

| | | |
|---|---|---|
| 2,023,856 | Sanders | Dec. 10, 1935 |
| 2,184,578 | Brittain | Dec. 26, 1939 |
| 2,197,110 | Muchnic | Apr. 16, 1940 |
| 2,234,070 | Barton | Mar. 4, 1941 |
| 2,431,364 | Blackburn et al. | Nov. 25, 1947 |